United States Patent
Hamida et al.

(10) Patent No.: US 9,587,951 B1
(45) Date of Patent: Mar. 7, 2017

(54) MAP MATCHING METHODS AND SYSTEM FOR TRACKING AND DETERMINING IMPROVED POSITION OF REFERENCE ASSETS

(71) Applicant: QATAR UNIVERSITY QSTP-B, Doha (QA)

(72) Inventors: Elyes Ben Hamida, Doha (QA); Fethi Filali, Doha (QA)

(73) Assignee: QATAR UNIVERSITY QSTP-B, Doha (QA)

( * ) Notice: Subject to any disclaimer, the term of this patent is extended or adjusted under 35 U.S.C. 154(b) by 0 days.

(21) Appl. No.: 14/304,938

(22) Filed: Jun. 15, 2014

(51) Int. Cl.
  *G01C 21/32*  (2006.01)
  *G01S 19/13*  (2010.01)

(52) U.S. Cl.
  CPC .............. *G01C 21/32* (2013.01); *G01S 19/13* (2013.01)

(58) Field of Classification Search
  CPC ....... H04L 67/18; H04L 29/06; H04L 41/046; H04L 69/329; H04L 27/2613; H04L 43/00; H04L 5/0048; H04L 65/403; G01C 21/16; G01C 21/20; G01C 21/30; G01C 21/32; G01C 22/006; G01S 19/13; G01S 19/14; G01S 19/49; G01S 19/51; G01S 1/08; G01S 5/16; A01D 34/008; H04B 2203/5458; H04B 3/54; H04B 3/548; G06F 17/30241; G06F 17/3087; G06F 1/1626; G06F 1/1632; G06F 1/1684; G06F 1/1694; G06F 1/1698; G06F 2200/1637; G06F 19/00; G06F 3/04815; G06F 3/0346; G06F 3/013
  See application file for complete search history.

(56) References Cited

U.S. PATENT DOCUMENTS

| | | | |
|---|---|---|---|
| 6,611,737 B1 * | 8/2003 | El-Tahan et al. | 701/21 |
| 7,952,079 B2 * | 5/2011 | Neustadter et al. | 250/393 |
| 8,924,054 B1 * | 12/2014 | Arbuckle et al. | 701/21 |
| 2008/0077326 A1 * | 3/2008 | Funk et al. | 701/220 |
| 2010/0156653 A1 * | 6/2010 | Chaudhari et al. | 340/686.1 |
| 2012/0245839 A1 * | 9/2012 | Syed et al. | 701/408 |
| 2013/0116967 A1 * | 5/2013 | Akcasu et al. | 702/150 |
| 2013/0229303 A1 * | 9/2013 | Marshall | 342/357.29 |

* cited by examiner

*Primary Examiner* — James Trammell
*Assistant Examiner* — James E. Stroud (57) ABSTRACT

Disclosed are map matching methods and system for tracking and determining an improved position of a reference asset. The method comprising: receiving at least one global navigation satellite system (GNSS) current position probe from the reference asset; requesting and receiving information from a geographical information system (GIS) unit on a plurality of probable road network segments on which the at least one GNSS current position probe is capable of being snapped; computing a weighted cost function for each of the probable road network segments; and snapping and information fusing the current position of the reference asset with a selected road network segment having the minimum weighted cost function out of the probable road network segments.

31 Claims, 6 Drawing Sheets

MAP MATCHING METHODS AND SYSTEM FOR TRACKING AND DETERMINING IMPROVED POSITION OF REFERENCE ASSETS

FIELD OF THE INVENTION

The present invention generally relates to tracking of assets, and more particularly to map matching methods and system for tracking and determining improved positions of reference assets.

BACKGROUND OF THE INVENTION

With the emergence of intelligent transportation systems (for example, fleet management, vehicle tracking, road traffic estimation, and similar applications), global navigation satellite system (GNSS) units are widely deployed to track the location of mobile assets, semi-mobile assets, and fixed assets. Accordingly, tracking and determining the accurate position of assets is a core requirement for enabling the emergence and feasibility of the intelligent transportation system applications.

However, existing localization GNSS technologies and road networks on digital maps are prone to errors when individually used. This calls for map matching/snapping technologies that can accurately align the asset positions from GNSS units to digital maps for fostering the emergence of value-added mobility and other services. However, none of the existing methods effectively provide for simplified and non-complex solutions for accurate tracking and position determination of assets.

Accordingly, what is required is methods and system that provides for simplified, lightweight, scalable, reliable and accurate tracking and position determination of assets.

SUMMARY OF THE INVENTION

In view of the foregoing disadvantages inherent in the prior-art, the general purpose of the present invention is to provide a map matching method and system for tracking and determining improved position of reference asset that is configured to include all advantages of the prior art and to overcome the drawbacks inherent in the prior art offering some added advantages.

In one aspect, the present invention provides a map matching method for tracking and determining an improved position of a reference asset, the method comprising: receiving at least one global navigation satellite system (GNSS) current position probe from the reference asset; requesting and receiving information from a geographical information system (GIS) unit on a plurality of probable road network segments on which the at least one GNSS current position probe is capable of being snapped; computing a weighted cost function for each of the probable road network segments; and snapping and information fusing the current position of the reference asset with a selected road network segment having the minimum weighted cost function out of the probable road network segments.

Each current position probe comprises: a current position of the reference asset; a heading direction of the reference asset; and a speed of the reference asset. The weighted cost function of each probable road network segment is computed as a function of: two weighting factors for considering weight for at least one of distance and angle related fractions; a distance between the current position of the reference asset and the road network segment; an input maximal distance difference; an absolute angle difference between the received heading direction of the reference asset and the heading direction of the road network segment; an input maximal angle difference; and an angle error of the road network segment.

In another aspect, the present invention provides a map matching method for tracking and determining an improved position of a reference asset, the method comprising: receiving at least one global navigation satellite system (GNSS) current position probe from the reference asset; requesting and receiving information from a geographical information system (GIS) unit on a road network segment that was previously selected for snapping and information fusing with a previous position probe of the reference asset; and snapping and information fusing the current position of the reference asset with the previously selected road network segment. Each current position probe comprises: a current position of the reference asset; a heading direction of the reference asset; and a speed of the reference asset.

In one aspect, the present invention provides a map matching system for tracking and determining an improved position of a reference asset, the system comprising: a map matching unit; a GNSS unit; and a GIS unit. The map matching unit comprises: a GNSS interaction module, a GIS interaction module, a weighted cost function module, and a snap processing module. The GNSS unit comprises: a GNSS position probe reader; and a GNSS position probe communicator. The GIS unit comprises: a road network manager; a request receiver and a processor module; and a determiner and transmitter module.

The road network manager is capable of storing, maintaining, and managing road networks and communication the information on road networks to the request receiver and processor module. The GIS interaction module is configured to request information from the request receiver and processor module on a plurality of probable road network segments on which the at least one GNSS current position probe is capable of being snapped. The request receiver and processor module is capable of processing the information request from the GIS interaction module and communicating the processed information on the plurality of probable road network segments to the GIS determiner and transmitter module. The GIS determiner and transmitter module is capable of determining and transmitting information on the plurality of probable road network segments to the GIS interaction module. The GIS interaction module is configured to communicate the information on the plurality of probable road network segments and the information on the at least one GNSS current position probe to the weighted cost function module. The weighted cost function module is configured to compute a weighted cost function for each of the probable road network segments and communicate the weighted cost function to the snap processing module.

These together with other aspects of the invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the invention.

BRIEF DESCRIPTION OF THE DRAWINGS

While the specification concludes with claims that particularly point out and distinctly claim the invention, it is believed that the advantages and features of the present invention will become better understood with reference to the following more detailed description of expressly disclosed exemplary embodiments taken in conjunction with the accompanying drawings. The drawings and detailed description which follow are intended to be merely illustrative of the expressly disclosed exemplary embodiments and are not intended to limit the scope of the present invention as set forth in the appended claims. In the drawings:

DETAILED DESCRIPTION OF THE INVENTION

The exemplary embodiments described herein detail for illustrative purposes are subject to obvious variations in method steps and system configuration. It should be emphasized, however, that the present invention is not limited to particular map matching methods and systems for tracking and determining improved position of reference assets. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The use of terms "including," "comprising," or "having" and variations thereof herein are meant to encompass the items listed thereafter and equivalents thereof as well as additional items. Further, the terms, "a" and "an" herein do not denote a limitation of quantity, but rather denote the presence of at least one of the referenced item.

The present invention provides methods and systems for tracking and determining improved positions of reference assets by map matching a set of raw positions (from global navigation satellite systems) of the reference assets to the road networks on a digital map (from geographical interaction systems). As used herein, map matching comprises the process of snapping and information fusing or associating asset positions to road networks on a digital map. Such a map matching provided of the asset positions with the road networks avoids the shortcomings when the inaccuracy and error prone results when either asset positions or road networks are used individually for tracking and determining positions of assets.

The method and system of the present invention provides for a lightweight and simplified map matching solution as there is no requirement for storage and use of recent or historical positions of reference assets. Further, the map matching solution of the present invention is highly scalable and may be integrated in embedded, low-complexity and resource limited devices.

Moreover, the map matching solution of the present invention provides for a weighted calculation, as the solution is based on fusion of multiple pieces of information both from the global navigation satellite systems and from the geographical interaction systems. All such information are fused together using a weighted function, and the raw positions are accurately snapped onto underlying road networks to come up with the improved position of the reference assets.

Figure 1:
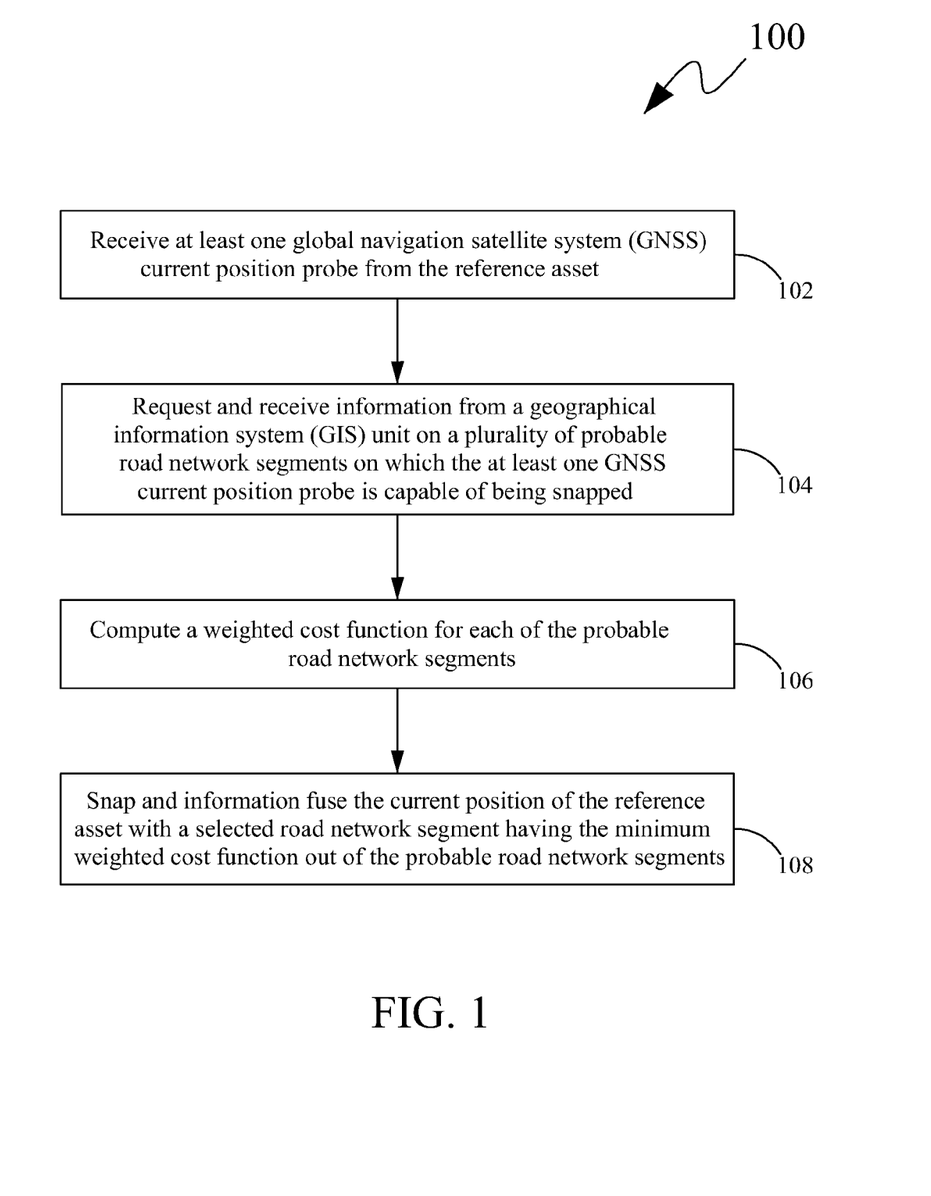
FIG. 1 illustrates a flow diagram of a map matching method for tracking and determining an improved position of a reference asset, according to an exemplary embodiment of the present invention.

FIG. 1 illustrates a flow diagram of a map matching method 100 for tracking and determining an improved position of a reference asset, according to an exemplary embodiment of the present invention. The method 100 depicted in flow diagram may be executed by, for example, by a system, such as the system 200 of FIG. 2. Operations of the flowchart, and combinations of operation in the flowchart, may be implemented by various means, such as hardware, firmware, processor, circuitry and/or other device associated with execution of software.

Figure 2:
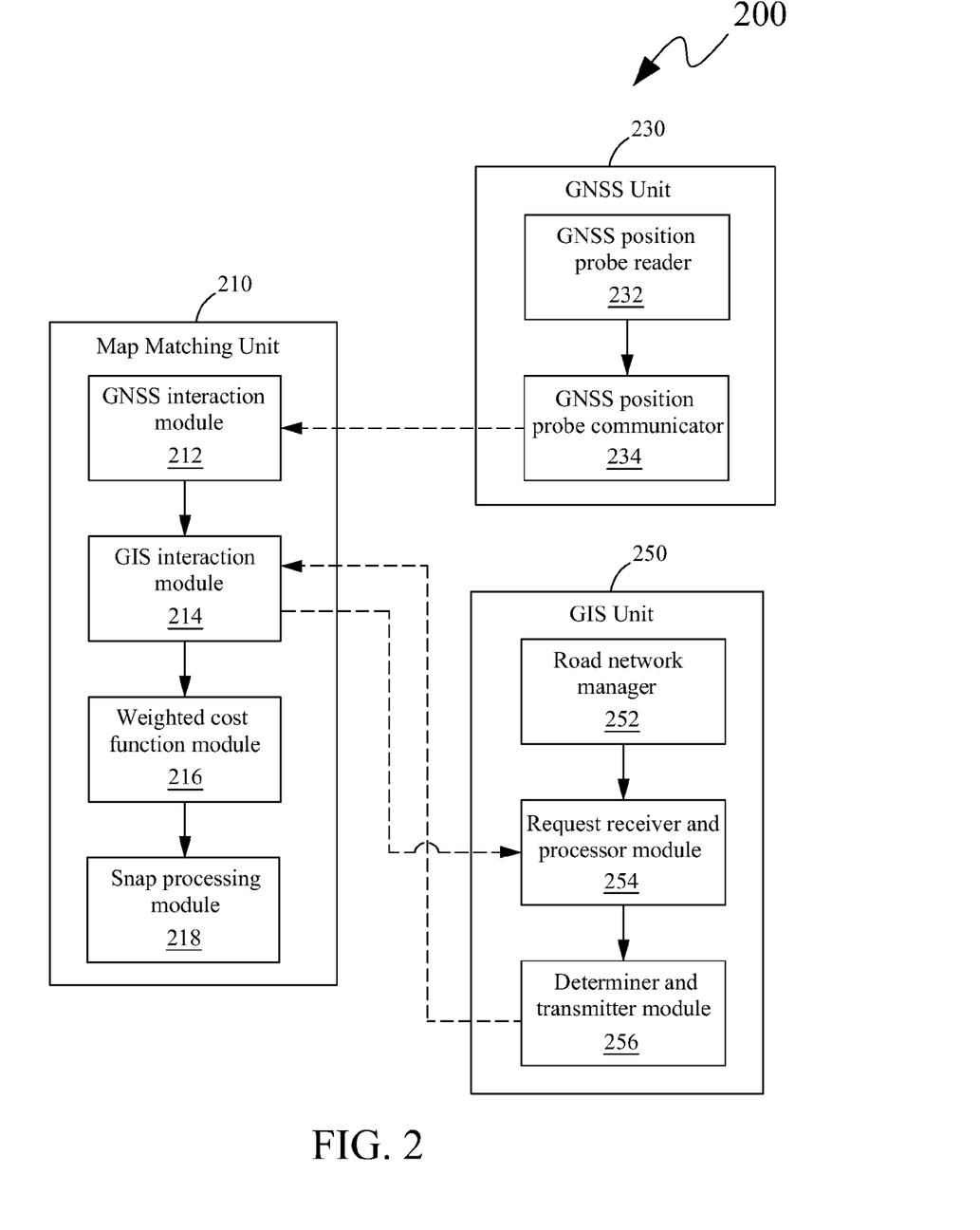
FIG. 2 a block diagram of a map matching system, according to an exemplary embodiment of the present invention.

The operations of the method 100 are described with help of the system 200 of FIG. 2. However, the operations of the method 100 may be described and/or practiced by using any other system. Referring to FIG. 2, the map matching system 200 comprises: a map matching unit 210; a global navigation satellite system (GNSS) unit 230; and a geographical interaction system (GIS) unit 250. The map matching unit 210 comprises: a GNSS interaction module 212, a GIS interaction module 214, a weighted cost function module 216, and a snap processing module 218. The GNSS unit 230 comprises: a GNSS position probe reader 232; and a GNSS position probe communicator 234. The GIS unit 250 comprises: a road network manager 252; a request receiver and a processor module 254; and a determiner and transmitter module 256. All these components are explained in sufficient detail below, while explaining the method 100 and the system 200.

Figure 3:
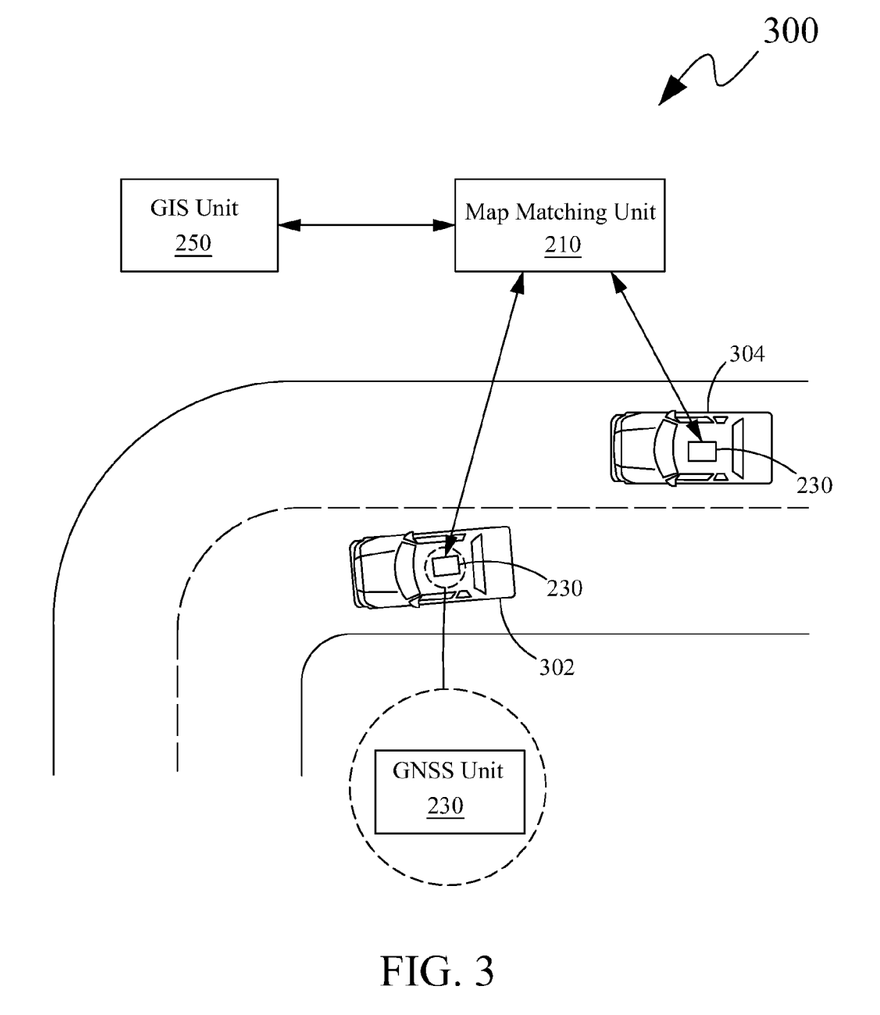
FIG. 3 depicts an overview of an environment in which exemplary method and system of the present invention may be practised.

Further, FIG. 3 illustrates herein overview of an environment in which methods (such as method 100) and systems (such as system 200) of the present invention may be practised. The method 100 and the system 200 are explained herein with reference to FIG. 1, FIG. 2 and FIG. 3.

Referring to FIG. 1, the method 100 starts at operation 102. At operation 102, the method 100 comprises receiving at least one GNSS current position probe from the reference asset (such as the reference assets 302 and 304 depicted in FIG. 3). As illustrated in FIG. 3, two reference assets 302 and 304 are illustrated for the purposes of description, however it will be evident to a person skilled in the art, that in a real world scenario, generally, there could be one or a plurality of reference assets in the field/environment 300.

As used herein, GNSS refers to a navigation system of satellites that provide autonomous geo-spatial positioning with global coverage. GNSS allows small electronic receivers to determine their location (longitude, latitude, and altitude) to high precision (within a few meters) using time signals transmitted along a line of sight by radio from satellites.

Some example of GNSS receivers in which the method and system of the present invention may be embodied are global positioning system (GPS), Galileo, GLONASS, BeiDou navigation satellite system (BDS). It will be evident to a person skilled in the art that the method and system of the present invention may be extended to other existing and future GNSS systems that would work on similar principles. As used herein GPS refers to a space-based satellite navigation system that provides location and time information in all weather conditions, anywhere on or near the earth where there is an unobstructed line of sight to four or more GPS satellites. The GPS provides critical capabilities to military, civil and commercial users around the world. GPS is maintained by the United States government and is freely accessible to anyone with a GPS receiver. As used herein, Galileo is a global navigation satellite system built by the European Union (EU) and European Space Agency (ESA). As used herein, GLONASS refers to a space-based satellite navigation system operated by the Russian Aerospace Defence Forces. As used herein, BDS is a Chinese satellite navigation system.

In one embodiment, the reference asset is a mobile reference asset, for example, automobiles. FIG. 3 depicts such a reference asset 302. In this embodiment, the mobile reference asset may be in a continuous motion. Alternatively, the mobile reference asset is in motion for a time and static for remaining time. Specifically, the reference asset may be mobile from time to time; and static for the remaining time. In another embodiment, the reference asset is always static, for example, a fixed sensor. Although, different types of reference assets and their mobility patterns are discussed herein, it will be evident to a person skilled in the art that the map matching and snap processing of the present invention is not limited by types or mobility patterns of the reference assets.

Also, each reference asset may send one or multiple position probes regardless of their mobility pattern. For every received position probe, the methods performs the map matching and snap fusing for only the reference asset in question, that is, only for the reference asset from which the position probe is received. For example, on receiving position probe L1 from reference asset 302 and another position probe L2 received from reference asset 304, each position probe L1, L2 will be snapped independently from the other ones.

Further defining the operation at 102, the method 100 comprises receiving the at least one current position probe from the reference asset on at least one a periodic and a non-periodic basis.

Further, defining the reference assets 302, 304, are assets that are GNSS enabled. In other words, the reference assets are equipped with GNSS receivers. For example, automobiles may be equipped with GNSS receivers at the factory or as aftermarket equipment. Such GNSS units often display moving maps and information about location, speed, direction, and nearby streets and points of interest. In one embodiment, the reference asset is a GPS-enabled reference asset capable of generating at least one GPS current position probe form the reference asset. Particularly, the reference asset has a GPS receiver unit, also interchangeable referred to as the GPS communication unit. In another embodiment, the reference asset is a Galileo-enabled reference asset capable of generating at least one Galileo current position probe form the reference asset. In still another embodiment, the reference asset is a GLONASS-enabled reference asset capable of generating at least one GLONASS current position probe form the reference asset. In yet another embodiment, the reference asset is a BDS-enabled reference asset capable of generating at least one BDS current position probe form the reference asset.

Each current position probe comprises: a current position of the reference asset (herein denoted as $P_i$); a heading direction of the reference asset (herein denoted as $H_i$); and a speed of the reference asset (herein denoted as $Sp_i$). The received current position may be a two-dimensional or a three-dimensional coordinate. In case of a two-dimensional coordinate, each current position of the reference asset comprises: a longitudinal position of the reference asset; and a latitudinal position of the reference asset. In case of a three-dimensional coordinate, the current position of the reference asset further comprises an altitude of the reference asset, in addition to a longitudinal position of the reference asset and a latitudinal position of the reference asset.

Referring to FIG. 2, the operation at 102 is implemented by components: GNSS position probe reader 232, GNSS position probe communicator 234, and the GNSS interaction module 212. Specifically, the GNSS position probe reader 232 is capable of reading the at least one GNSS current position probe of the reference asset and communicating the at least GNSS current position probe to the GNSS probe communicator. Further, the GNSS interaction module 212 is configured to receive the at least one GNSS current position probe from the GNSS position probe communicator 234.

Referring to FIG. 1, at operation 104, the method 100 further comprises requesting and receiving information from a GIS unit (such as, the GIS unit 250) on a plurality of probable road network segments on which the at least GNSS current position probe is capable of being snapped.

Figure 4:
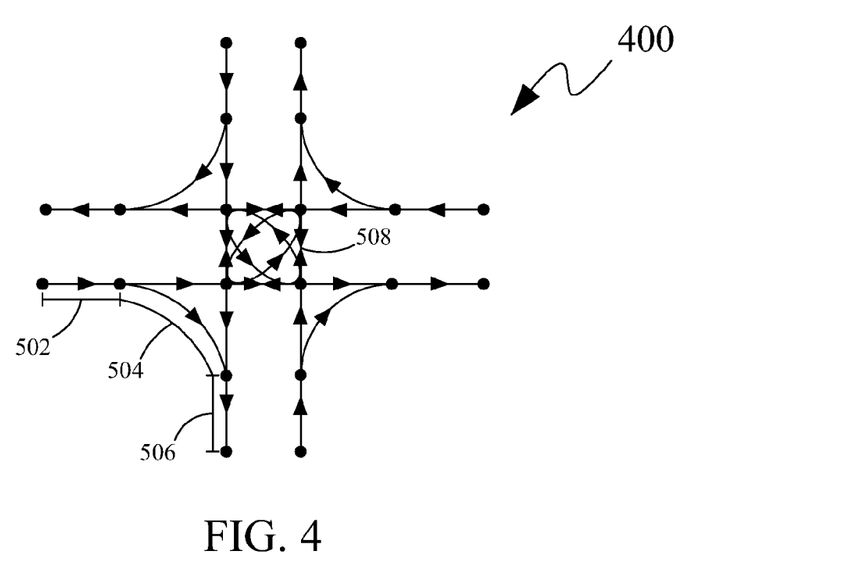
FIG. 4 illustrates a road network in which exemplary embodiments of the present invention may be practised.
Figure 5:
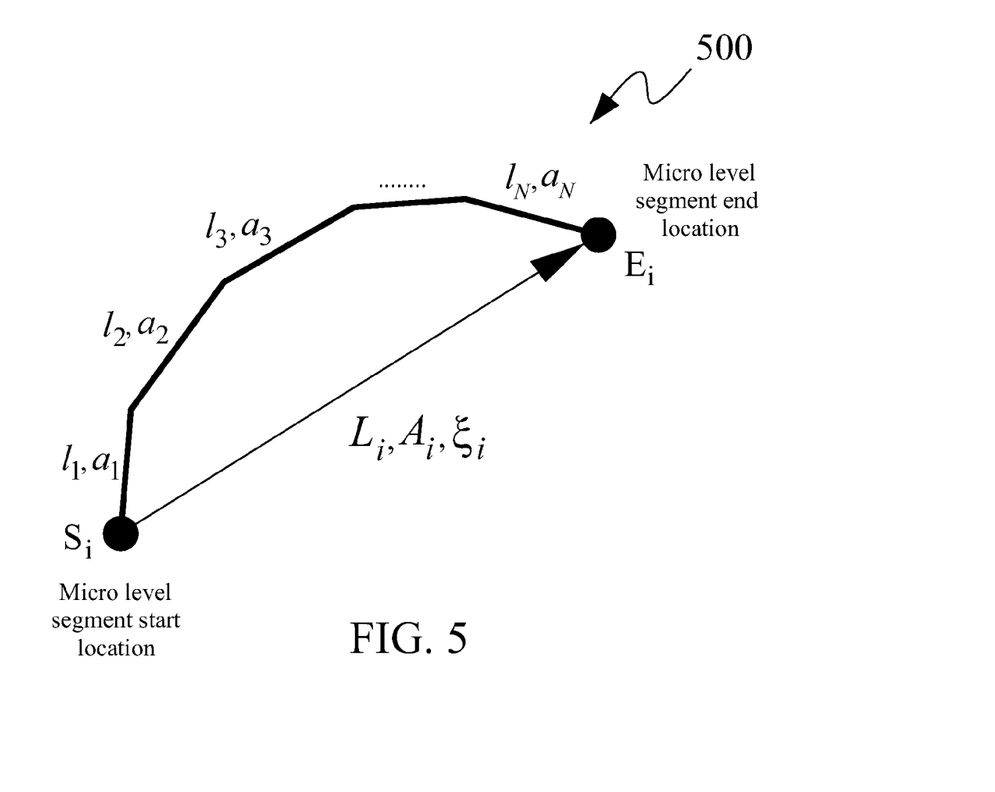
FIG. 5 illustrates a road network segment in which exemplary embodiments of the present invention may be practised.

For the purposes of the description of invention, "road network" and "road network segment" are defined herein. FIG. 4 illustrates a road network 400 in which embodiments of the present invention may be practised. FIG. 5 illustrates a road network segment 500 in which embodiment of the present invention may be practised. Referring to FIGS. 4 and 5, the road network 400 is composed of a plurality of road network segments 502, 504, 506, 508 and so on (herein collectively and individually referred to as road network segment(s) 500). The road network segment(s) are also commonly known as micro-level segments constituting the streets of different classes (for example, major streets, minor streets, highways, connectors, collectors, and the like).

As discussed above, one of the primary objectives of the present invention is to snap or align the received raw GNSS current position probes from the reference asset on the corresponding road network segments/micro-level segments. The accurate and appropriate snapping of GNSS current position probes on the corresponding road network segments/micro-level segments is a key requirement to enable the emergence of mobility of value added services, for example, road congestion or traffic estimation, tracking of fleet of mobile assets, and the like.

For the purposes of description, each road network segment 500 is denoted by i. Referring to FIG. 5, each road network segment (i) comprises: a start location ($S_i$) of the road network segment (i); an end location ($E_i$) of the road network segment (i); an angle ($A_i$) of the road network segment (i) (also defined as the segment overall heading); a length ($L_i$) of the road network segment (i); a segment geometry; and an angle error ($\xi_i$) of the road network segment (i).

Given a road network segment (i), its geometry is composed by a set of sub-segments (j) where each sub-segment is characterized by a length ($l_j$, $\forall j \in [1, N]$) and a heading or angle ($a_j$, $\forall j \in [1, N]$).

The angle ($A_i$) of the road network segment (i) is computed as the azimuth between the micro level segment start location and end location. In the case of straight route segments, the angle ($A_i$) of the road network segment (i) is equal to the different sub-segments angles ($a_j$, $\forall j \in [1, N]$), that is, $A_i = a_j$, $\forall j \in [1, N]$, and the corresponding angle error ($\xi_i$) of the road network segment (i) is equal to zero, that is, $\xi_i = 0$ degrees.

However, in case of highly curved road network segments (for example, the road network segment 500 of FIG. 5), the angle ($A_i$) of the road network segment (i) is still computed as the azimuth between the start location and end location, and is thus prone to errors. In one embodiment, angle error ($\xi_i$) of the road network segment (i) is calculated by computing a weighted function as follows:

$$\xi_i = \sum_{j=1}^{N} \left( \frac{l_j}{L_i} \times d_{ANGLE}(a_j, A_i) \right)$$

where $d_{ANGLE}(a_j, A_i)$ is the absolute angle difference between the angle ($A_i$) of the road network segment (i) and the road network sub-segment angle ($a_j$).

At this stage, we assume that the road networks on a digital map is available at the GIS unit 250, as shown in FIG. 2, and that the proposed weighted angle error metric was applied on all available micro level segments to estimate angle error of the road network segment ($\xi_i$) This step is a preliminary requirement to apply the proposed map matching method, as described herein.

Referring to FIG. 2, the operation at 104 is implemented by components: the road network manager 252, the request receiver and processor module 254, the determiner and transmitter module 256, and the GIS interaction module 214. Specifically, the road network manager 252 is capable of storing, maintaining, and managing road networks (on digital maps). Further, the road network manager 252 is capable of communicating the information on road networks to the request receiver and processor module 254.

The GIS interaction module 214 is configured to request information from the request receiver and processor module 254 on a plurality of road network segments on which at the at least one GNSS current position probe is capable of being snapped. The request receiver and processor module 254 is capable of processing the information request from the GIS interaction module 214. Further, the request receiver and processor module 254 is capable of communicating the processed information on the plurality of the probable road network segments to the GIS determiner and transmitter module 256.

The GIS determiner and transmitter module 256 is capable of determining and transmitting information on plurality of probable road network segments to the GIS interaction module 214. The GIS interaction module 214 is configured to communicate the information on the plurality of probable road network segments and the information on at least one GNSS current position probe to the weighted cost function module.

The extraction of information on the plurality of probable road network segments is an important step of the map matching employed in the present invention. Specifically, the map matching unit 210 extracts a plurality of probable road network segments ($S_k$) from the GIS unit 250 on which at the at least one current position probe is capable of being snapped.

To be as an eligible candidate for a probable road network segment, each probable road network segment comprises the following features: (i) a distance between the received current position ($P_i$) of the reference asset and the probable road network segment ($S_k$) is lower than a pre-defined maximal distance ($R_{max}$), that is, $d_{SEG}(P_i, S_k) \leq R_{max}$; and (ii) an absolute angle difference between the received heading direction ($H_i$) of the reference asset and the heading direction ($A_k$) of the road network segment ($S_k$) is lower than or equal to a sum of a predefined maximal angle difference ($A_{max}$) and the angle error ($\xi_k$) of the probable road network segment, that is, $d_{ANGLE}(A_k, H_i) \leq (A_{max} + \xi_k)$.

Referring to FIG. 1, at operation 106, the method 100 further comprises computing a weighted cost function ($C_k$) for each of the probable road network segments ($S_k$). The weighted cost function ($C_k$) of each probable road network segment ($S_k$) is computed as a function of: two weighting factors ($\alpha$ and $\beta$) for considering weight for at least one of distance and angle related fractions; a distance ($d_{SEG}(P_i, S_k)$) between the current position ($P_i$) of the reference asset and the road network segment ($S_k$); an input maximal distance difference ($R_{max}$); an absolute angle difference ($d_{ANGLE}(A_k, H_i)$) between the received heading direction ($H_i$) of the reference asset and the heading direction ($A_k$) of the road network segment; an input maximal angle difference ($A_{max}$); an angle error ($\xi_k$) of the road network segment ($S_k$). Particularly, the weighted cost function ($C_k$) is computed as follows:

$$C_k = \alpha \times \left( \frac{d_{SEG}(P_i, S_k)}{R_{max}} \right) + \beta \times \left( \frac{d_{ANGLE}(A_k, H_i)}{A_{max} + \xi_k} \right)$$

Referring to FIG. 2, the operation at 106 is implemented by the weighted cost function module 216. Specifically, the weighted cost function module 216 is configured to compute a weighted cost function ($C_k$) for each of the probable road network segments and communicate the weighted cost function ($C_k$) to the snap processing module 218.

Again referring to FIG. 1, at operation 108, the method 100 further comprises snapping and information fusing the current position ($P_i$) of the reference asset with a selected road network segment ($\hat{S}_k$) having the minimum weighted cost function ($C_k$) out of the probable road network segments, that is, $\hat{S}_k = \arg \min C_k$. Once, the target road network segment ($\hat{S}_k$) is selected, the current position ($P_i$) is projected or aligned on this segment, and a new improved position ($\hat{P}_i$) is determined for this reference asset.

Referring to FIG. 2, the operation at 108 is implemented by the snap processing module 218. Specifically, the snap processing module 218 is capable of snapping and information fusing the current position of the reference asset with the selected road network segment having the minimal weighted cost function out of the probable road network segments.

Figure 6:
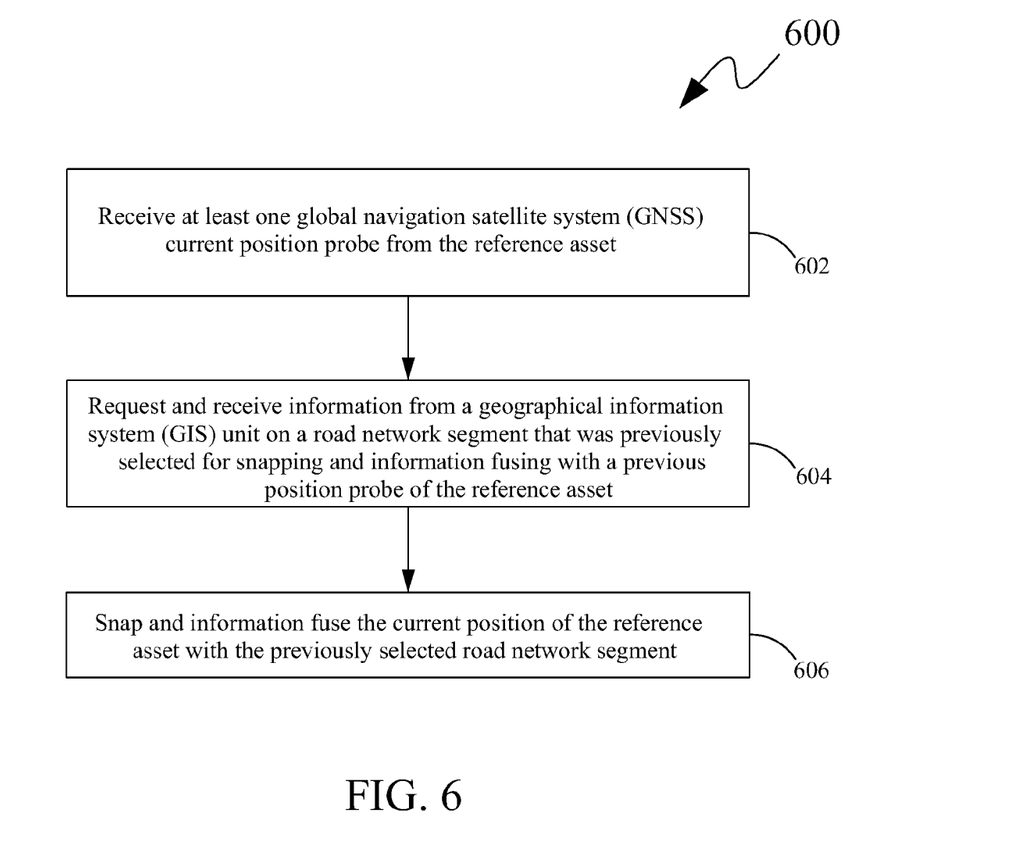
FIG. 6 illustrates a flow diagram of a map matching method for tracking and determining an improved position of a reference asset, according to another exemplary embodiment of the present invention.

FIG. 6 illustrates a flow diagram of a map matching method 600 for tracking and determining an improved position of a reference asset, according to another exemplary embodiment of the present invention. At operation 602, the method 600 comprises receiving at least one GNSS current position probe from the reference asset. Each GNSS current position probe comprises: a current position of the reference asset; a heading direction of the reference asset; and a speed of the reference asset.

At operation 604, the method 604 comprises requesting and receiving information from a GIS unit on a road network segment that was previously selected for snapping and information fusing with a previous position probe of the reference asset.

At operation 606, the method 606 comprises snapping and information fusing the current position probe with the previously selected road network segment. Such a snapping and information fusing of the current position probe with the previously selected road network segment is done only when the following three conditions are met.

Figure 7:
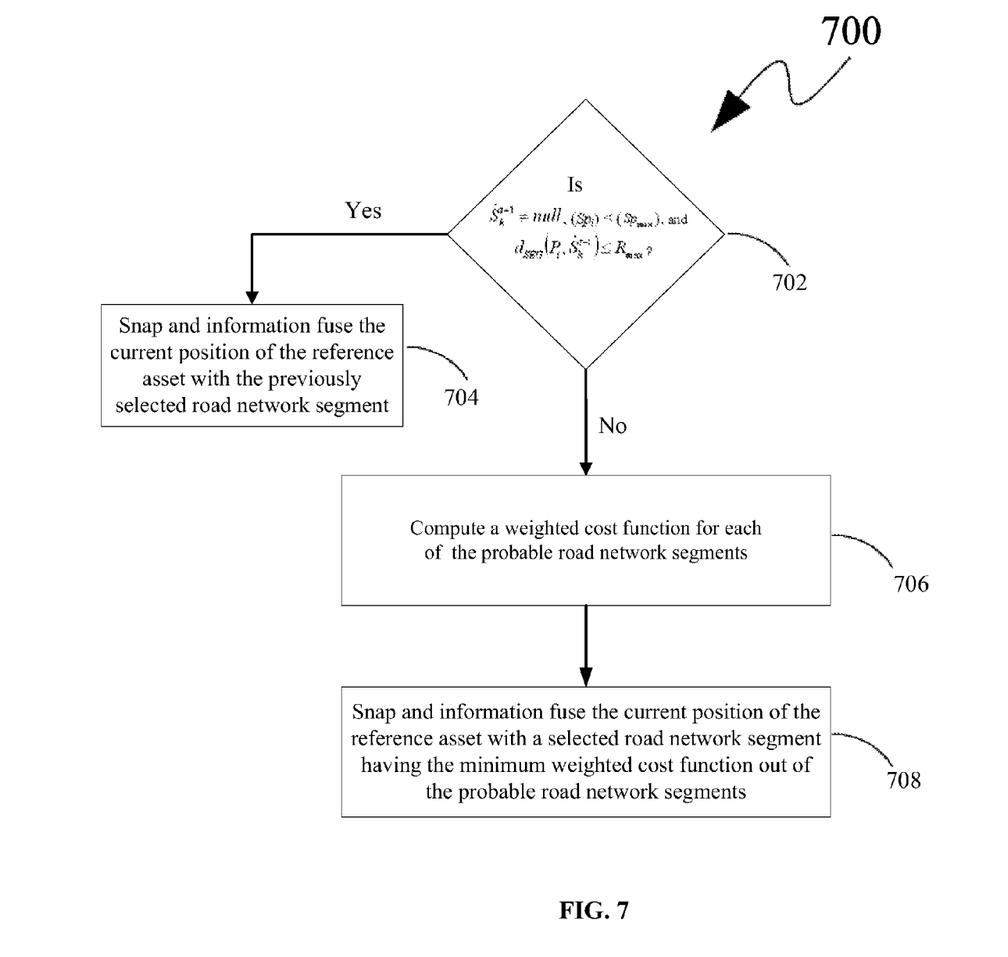
FIG. 7 is a flow diagram of an option step for exemplary method of FIG. 6 while implementing said method of FIG. 1, according to another exemplary embodiment of the present invention.

In FIG. 7, an optional method step is illustrated along with details on the three conditions, while implementing the method 100 of FIG. 1, herein after collectively referred to as map matching method 700 for tracking and determining an improved position of a reference asset with the optional step. At operation 702, the method comprises a decision step for deciding whether the three conditions are met. The first condition is that the current position ($P_i$) of the reference asset is received from a previously know reference asset (i). Specifically, the reference asset (i) has already sent at least on GNSS current position probe to the map matching unit 210 in a previous round (t−1), and which was successfully snapped to a target road network segment ($\hat{S}_k^{t-1}$), i.e. $\hat{S}_k^{t-1} \neq$ null.

The second condition is that the speed of the reference asset ($Sp_i$) is lower than a pre-defined speed limit ($Sp_{max}$).

The third condition is that the current position ($P_i$) of the reference asset is located at a pre-defined distance that is lower than or equal to a maximal distance ($R_{max}$) from the previously selected road network segment ($\hat{S}_k^{t-1}$), i.e. $d_{SEG}(P_i, \hat{S}_k^{t-1}) \leq R_{max}$.

At operation 704, on the above three conditions meeting, the current position ($P_i$) of the reference asset is snapped or aligned on the previously selected road network segment. This is similar to the process described for operation 606 of FIG. 6.

If the three conditions are not met, at operation 706, the method 700 moves on to comprising computing a weighted cost function ($C_k$) for each of the probable road network segments ($S_k$). This is similar to operation 106 of FIG. 1. Thereafter, the method 700 moves on to operation 708 comprising snapping and information fusing the current position ($P_i$) of the reference asset with a selected road network segment ($\hat{S}_k$) having the minimum weighted cost function ($C_k$) out of the probable road network segments, that is, $\hat{S}_k = \arg\min C_k$. This is similar to operation 108 of FIG. 1.

Also, techniques, devices, subsystems and methods described and illustrated in the various exemplary embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled to each other but may still be indirectly coupled and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

What is claimed is:

1. A map matching method for tracking and determining an improved position of a reference asset, the method comprising:
   receiving at least one global navigation satellite system (GNSS) current position probe from the reference asset, each current position probe comprising
      a current position of the reference asset,
      a heading direction of the reference asset, and
      a speed of the reference asset;
   requesting and receiving information from a geographical information system (GIS) unit on a plurality of probable road network segments on which the at least one GNSS current position probe is capable of being snapped;
   computing a weighted cost function for each of the probable road network segments, wherein the weighted cost function of each probable road network segment is computed as a function of
      two weighting factors for considering weight for at least one of distance and angle related fractions,
      a distance between the current position of the reference asset and the road network segment,
      an input maximal distance difference,
      an absolute angle difference between the received heading direction of the reference asset and a heading direction of the road network segment,
      an input maximal angle difference, and
      an angle error of the road network segment, wherein the angle error of the road network segment is computed as a weighted function; and
   snapping and information fusing the current position of the reference asset with a selected road network segment having the minimum weighted cost function out of the probable road network segments.

2. The method of claim 1, wherein the current position of the reference asset comprises:
   a longitudinal position of the reference asset, and
   a latitudinal position of the reference asset.

3. The method of claim 2, wherein the current position of the reference asset further comprises an altitude of the reference asset.

4. The method of claim 1, wherein the reference asset is a global positioning system (GPS)-enabled reference asset capable of generating at least one GPS current position probe from the reference asset.

5. The method of claim 1, wherein the reference asset is a Galileo-enabled reference asset capable of generating at least one Galileo current position probe from the reference asset.

6. The method of claim 1, wherein the reference asset is a GLONASS-enabled reference asset capable of generating at least one GLONASS current position probe from the reference asset.

7. The method of claim 1, wherein the reference asset is a BeiDou navigation satellite system (BDS)-enabled reference asset capable of generating at least one BDS current position probe from the reference asset.

8. The method of claim 1, wherein the reference asset is a mobile reference asset.

9. The method of claim 1, wherein the reference asset is a static reference asset.

10. The method of claim 8, wherein the mobile reference asset is in continuous motion.

11. The method of claim 8, wherein the mobile reference asset is in motion for a time and static for the remaining time.

12. The method of claim 1, wherein for each probable road network segment:
   a distance between the received current position of the reference asset and the road network segment is lower than a pre-defined maximal distance; and
   an absolute angle difference between the received heading direction of the reference asset and the heading direction of the road network segment is lower than or equal to a sum of a predefined maximal angle and an angle error of the road segment.

13. The method of claim 1, further comprises receiving the at least one current position probe from the reference asset on at least one of a periodic basis and non-periodic basis.

14. The method of claim 1, wherein each of the probable road network segment comprises information of:
   a start location of the road network segment;
   an end location of the road network segment;
   an angle of the road network segment;
   a length of the road network segment;
   a segment geometry; and
   the angle error of the road network segment.

15. A map matching method for tracking and determining an improved position of a reference asset, the method comprising:
   receiving at least one global navigation satellite system (GNSS) current position probe from the reference asset, each GNSS current position probe comprising
      a current position of the reference asset,
      a heading direction of the reference asset, and
      a speed of the reference asset;
   requesting and receiving information from a geographical information system (GIS) unit on a road network segment that was previously selected for snapping and information fusing with a previous position probe of the reference asset; and
   snapping and information fusing the current position of the reference asset with the previously selected road network segment;
   wherein the current position of the reference asset is received from a previously known reference asset,
   wherein the speed of the reference asset is lower than a pre-defined speed limit,
   wherein the current position of the reference asset is located at a pre-defined distance that is lower than or equal to a maximal distance from the previously selected network road segment.

16. The method of claim 14, wherein the reference asset is a mobile reference asset.

17. The method of claim 14, wherein the reference asset is a static reference asset.

18. A map matching system for tracking and determining an improved position of a reference asset, the system comprising:
   a map matching unit comprising a global navigation satellite system (GNSS) interaction module, a geographical interaction system (GIS) interaction module, a weighted cost function module, and a snap processing module;
   a GNSS unit incorporated in the reference asset, the GNSS unit comprising a GNSS position probe reader and a GNSS position probe communicator; and
   a GIS unit comprising a road network manager, a request receiver and a processor module, and a determiner and transmitter module;
   wherein the GNSS position probe reader is capable of reading at least one GNSS current position probe of the reference asset and communicating the at least one GNSS current position probe to the GNSS position probe communicator;
   wherein the GNSS interaction module is configured to receive the at least one GNSS current position probe from the GNSS position probe communicator, each current position probe comprising
      a current position of the reference asset,
      a heading direction of the reference asset, and
      a speed of the reference asset;
   wherein the road network manager is capable of storing, maintaining, and managing road networks and communication the information on road networks to the request receiver and processor module;
   wherein GIS interaction module is configured to request information from the request receiver and processor module on a plurality of probable road network segments on which the at least one GNSS current position probe is capable of being snapped;
   wherein the request receiver and processor module is capable of processing the information request from the GIS interaction module and communicating the processed information on the plurality of probable road network segments to the GIS determiner and transmitter module;
   wherein the GIS determiner and transmitter module is capable of determining and transmitting information on the plurality of probable road network segments to the GIS interaction module;
   wherein the GIS interaction module is configured to communicate the information on the plurality of probable road network segments and the information on the at least one GNSS current position probe to the weighted cost function module;
   wherein the weighted cost function module is configured to compute a weighted cost function for each of the probable road network segments and communicate the weighted cost function to the snap processing module, wherein the weighted cost function of each probable road network segment is computed as a function of
      two weighting factors for considering weight for at least one of distance and angle related fractions,
      a distance between the current position of the reference asset and the road network segment,
      an input maximal distance difference,
      an absolute angle difference between the received heading direction of the reference asset and a heading direction of the road network segment,
      an input maximal angle difference,
      an angle error of the road network segment, wherein the angle error of the road network segment is computed as a weighted function;
   wherein the snap processing module is configured to snap and information fuse the current position of the reference asset with the selected road network segment having the minimal weighted cost function out of the probable road network segments.

19. The system of claim 18, wherein the current position of the reference asset comprises:
 a longitudinal position of the reference asset; and
 a latitudinal position of the reference asset.

20. The system of claim 19, wherein the current position of the reference asset further comprises an altitude of the reference asset.

21. The system of claim 18, wherein the reference asset is a global positioning system (GPS)-enabled reference asset capable of generating at least one GPS current position probe from the reference asset.

22. The system of claim 18, wherein the reference asset is a Galileo-enabled reference asset capable of generating at least one Galileo current position probe from the reference asset.

23. The system of claim 18, wherein the reference asset is a GLONASS-enabled reference asset capable of generating at least one GLONASS current position probe from the reference asset.

24. The system of claim 18, wherein the reference asset is a BeiDou navigation satellite system (BDS)-enabled reference asset capable of generating at least one BDS current position probe from the reference asset.

25. The system of claim 18, wherein the reference asset is a mobile reference asset.

26. The system of claim 18, wherein the reference asset is a static reference asset.

27. The system of claim 25, wherein the mobile reference asset is in continuous motion.

28. The system of claim 25, wherein the mobile reference asset is in motion for a time and static for the remaining time.

29. The system of claim 18, wherein for each probable road network segment:
 a distance between the received current position of the reference asset and the road network segment is lower than a pre-defined maximal distance; and
 an absolute angle difference between the received heading direction of the reference asset and the heading direction of the road network segment is lower than or equal to a sum of a predefined maximal angle and an angle error of the road segment.

30. The system of claim 18, wherein the position module receives the at least one current position probe from the reference asset on at least one of a periodic basis and non-periodic basis.

31. The system of claim 18, wherein each of the probable road network segment comprises information of:
 a start location of the road network segment;
 an end location of the road network segment;
 an angle of the road network segment;
 a length of the road network segment;
 a segment geometry; and
 the angle error of the road network segment.

\* \* \* \* \*